(12) United States Patent
Patel et al.

(10) Patent No.: US 7,525,269 B2
(45) Date of Patent: Apr. 28, 2009

(54) METHOD AND APPARATUS FOR SENSORLESS POSITION CONTROL OF A PERMANENT MAGNET SYNCHRONOUS MOTOR (PMSM) DRIVE SYSTEM

(75) Inventors: Nitinkumar R. Patel, Cypress, CA (US); Bon-Ho Bae, Torrance, CA (US); James M. Nagashima, Cerritos, CA (US)

(73) Assignee: GM Global Technology Operations, Inc., Detroit, MI (US)

( * ) Notice: Subject to any disclaimer, the term of this patent is extended or adjusted under 35 U.S.C. 154(b) by 624 days.

(21) Appl. No.: 11/300,525

(22) Filed: Dec. 14, 2005

(65) Prior Publication Data
US 2007/0132415 A1  Jun. 14, 2007

(51) Int. Cl.
*H02P 7/00* (2006.01)
(52) U.S. Cl. .................................... 318/432; 318/434

(58) Field of Classification Search ................. 318/432, 318/434
See application file for complete search history.

(56) References Cited

U.S. PATENT DOCUMENTS 5,585,709 A * 12/1996 Jansen et al. ................. 318/807

* cited by examiner

*Primary Examiner*—Donovan Lincoln
*Assistant Examiner*—Erick Glass (57) ABSTRACT

Methods and apparatus are provided for generating zero-sequence voltages based on voltage commands and a motor output signal. At least one of the methods includes, but is not limited to, receiving a torque command and generating three-phase voltage commands based on the torque command. The method also includes, but is not limited to, generating a motor output responsive to the three-phase voltage commands and generating three-phase zero-sequence voltage samples based on the three-phase voltage commands and the motor output.

17 Claims, 6 Drawing Sheets

METHOD AND APPARATUS FOR SENSORLESS POSITION CONTROL OF A PERMANENT MAGNET SYNCHRONOUS MOTOR (PMSM) DRIVE SYSTEM

TECHNICAL FIELD

The present invention generally relates to control systems and power inverter modules, and, more particularly, to control systems, methods and apparatus for control of a PMSM drive system.

BACKGROUND OF THE INVENTION

An electric traction drive system typically includes a power inverter module (PIM) and an AC motor.

Many common sensorless position control methods of a traction drive systems either rely on spatial variation of rotor saliency of a rotor of the drive system or Back EMF of the inherent saliency machine of the drive system. These methods are more suitable with Interior Permanent Magnet Synchronous Motor (IPMSM), Synchronous Reluctance Motor and Switched Reluctance Motor machine types which inherently have magnetically salient rotors.

Other methods of detecting rotor angular position include high frequency signal injection and modified PWM test pulse excitation.

In the high frequency signal injection method, a balanced high frequency test signal, such as a voltage or current signal, can be injected on a stator winding of an inherently salient machine and the resultant effect of the balanced high frequency test signal on stator current can be measured. The effect of the balanced high frequency test signal injection can be observed in a measured stator current which takes the form of amplitude modulation at two times the fundamental frequency rate. This effect is due to the spatial modulation of the magnetic saliency as the rotor rotates. This method works quite well when the machine under test has inherent saliency, such as an Interior Permanent Magnet type machine. However, Surface Mount Permanent Magnet (SMPM) machines have no saliency and therefore require a very high magnitude injection signal in order to retrieve the position information. Thus, due to additional losses and noise generated by such a high magnitude injection signal, this method is not suitable for SMPM type application.

In the modified PWM test pulse excitation method, modified PWM test pulses can be used to excite the high frequency impedance of the machine. When PWM test pulses are injected, the current control is ignored for the test period. This can be a good method for an industrial drive. However, a traction machine has low inductance and not controlling current during test period may result in an uncontrolled condition. This technique retrieves the position information from sensed stator current which must be sampled immediately after injecting the test pulses. This increases number of times the stator current is being sampled.

According to another method of rotor position estimation discussed in European patent # EP 0962045 B1, the resultant effect of modified PWM test pulses on leakage inductances can be measured via a measured phase to neutral voltage of an induction machine. This technique utilizes the property of a squirrel cage type rotor construction in an induction machine. By injecting the PWM test pulses, the "mechanical" saliency induced due to the rotor bars of the induction machine can be utilized. A saliency image rotates as the rotor rotates and this information can be used to deduce rotor position information.

However, magnetic saliency is not a feature of a Surface Mount Permanent Magnet Motor (SMPMM). Thus, position sensorless control for a SMPMM can be challenging.

A high performance permanent magnet ("PM") machine drive system requires an absolute position sensor which is an expensive component. Moreover, the circuitry required to process its signals can also be expensive. It would be desirable to eliminate this position sensor. It would also be desirable to eliminate mechanical interface hardware, reduce cost and weight, reduce cost and weight and improve the reliability of an electric traction drive system. Other desirable features and characteristics of the present invention will become apparent from the subsequent detailed description and the appended claims, taken in conjunction with the accompanying drawings and the foregoing technical field and background.

DESCRIPTION OF THE DRAWINGS

The present invention will be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description. The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

Overview

Embodiments of the present invention provide methods and apparatus that allow for generating of zero-sequence voltages based on voltage commands and a motor output signal.

It has been observed that the PM (permanent magnet) in rotor and the stator electric circuit can cause a saturation effect of a stator core due to the magnetic flux. The saturation affects the inductance of three phase windings. For example, in an iron-based stator core, the more saturated winding has a lower inductance. Therefore if the inductance variation of the three phase winding is measured, stator flux information can be determined. The stator flux of the permanent magnet synchronous motor is represented in a stationary reference frame by equation (1), where $\lambda_{ds}^{s}$, $\lambda_{qs}^{s}$ are d-axis and q-axis stator flux linkage, respectively, $\lambda_{PM}$ is the stator flux linkage of the permanent magnet, $i_{ds}^{s}$, $i_{qs}^{s}$ are the d-axis and q-axis stator current, and $\theta_r$ is the rotor angle.

$$\lambda_{ds}^{s}=L_d i_{ds}^{s}+\lambda_{PM}\cos(\theta_r) \quad (1)$$

$$\lambda_{qs}^{s}=L_q i_{qs}^{s}+\lambda_{PM}\sin(\theta_r) \quad (2)$$

If the stator current and inductances are known, the rotor-oriented component of the stator flux can be derived among the total stator flux, and then the rotor flux angle can be calculated.

Figures 1, 2:
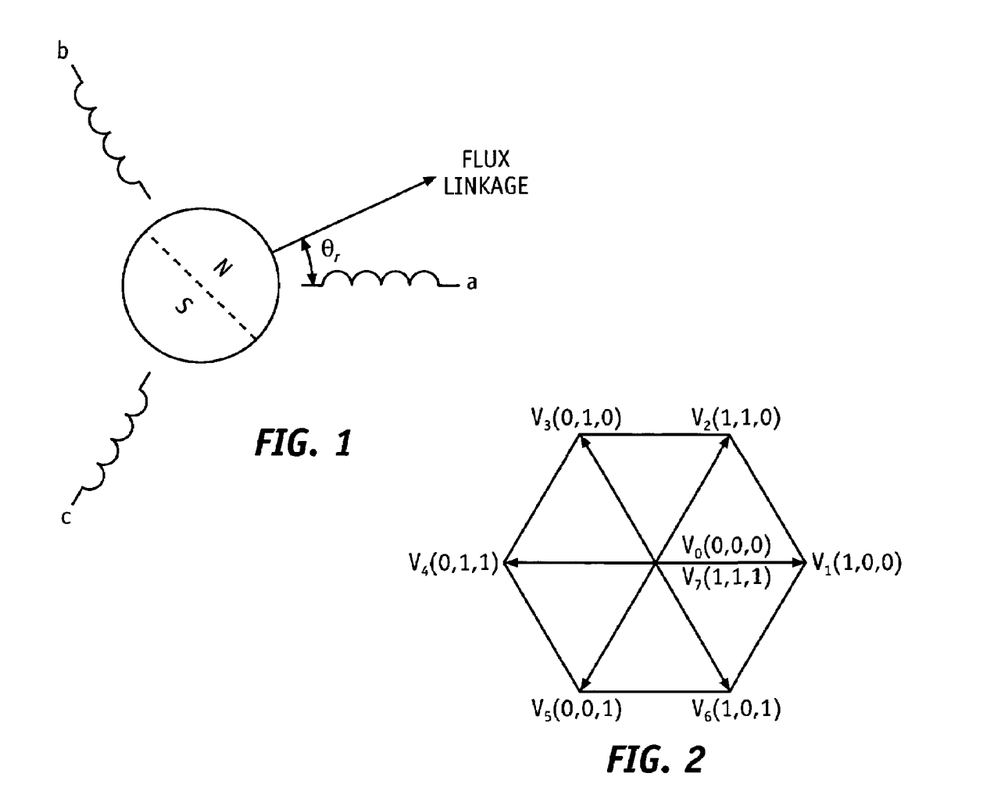
FIG. 1 is a diagram of a simple 2-pole SMPMM showing a configuration of stator windings a, b, c and a PM.
FIG. 2 is a diagram which illustrates switching vectors and switching status of switches of a 2-level 3-phase inverter having eight available switching vectors.

FIG. 1 is a diagram of a simple 2-pole SMPMM in a showing a configuration of stator windings a, b, c and a PM. FIG. 1 describes the relation between the stator inductance variation and the zero sequence voltage which is the sum of the phase to neutral voltages of phase A, B and C of the motor. For simplicity the 2 pole machine is used for the analysis, however, it should be appreciated that a similar analysis would apply to higher pole machines.

The variation of the stator inductance in the motor depends on the flux distribution of the PM and the electromagnetic design magnetic design. The stator inductances ($l_a$, $l_b$, $l_c$) of phase a, b, and c can be described below in equations (3)-(5).

$$l_a = L_{s0} + l_\sigma f(\theta_r) \quad (3)$$

$$l_b = L_{s0} + l_\sigma f\left(\theta_r - \frac{2}{3}\pi\right) \quad (4)$$

$$l_c = L_{s0} + l_\sigma f\left(\theta_r + \frac{2}{3}\pi\right) \quad (5)$$

In equations (3)-(5), $L_{s0}$ is the average stator inductance, $l_\sigma$ is the coefficient of stator inductance variance, and $f(\theta_r)$ is a periodic function with period of π. The stator inductances of a SMPMM for example can be assumed as:

$$l_a = L_{s0} + l_\sigma \cos(2\theta_r) \quad (6)$$

$$l_b = L_{s0} + l_\sigma \cos\left[2\left(\theta_r - \frac{2}{3}\pi\right)\right] \quad (7)$$

$$l_c = L_{s0} + l_\sigma \cos\left[2\left(\theta_r + \frac{2}{3}\pi\right)\right] \quad (8)$$

To obtain stator inductance variance information, this embodiment utilizes the zero sequence voltage components. When the three inductances of phase A, B and C are equivalent, the zero sequence voltage component is zero. However, if the inductances are not equivalent, it has a value according to the configuration of the inverter switches. This condition may occur due to the main flux saturation. The main flux is composed of the stator and the rotor PM flux. Thus by observing the zero sequence voltage, the rotor position information can be deduced.

Inverter Switching Configuration

FIG. 2 is a diagram which illustrates switching vectors and switching status of switches of a 2-level 3-phase inverter having eight available switching vectors ($V_0 \ldots V_7$). The zero sequence voltage is dependent on both the inductance variance and the inverter configuration due to switching status. Therefore by investigating the zero sequence voltage profile at each switching status, the appropriate combination can be derived to produce unbalanced three phase inductances at every switching instance.

FIGS. 3-8 are circuit diagrams which represent possible three phase stator winding configurations of stator windings with respect to the switching vectors shown in FIG. 2.

Figure 3:
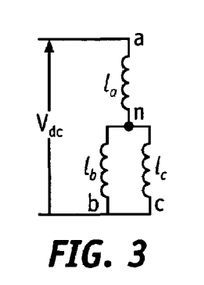
FIG. 3 is a circuit diagram which represents a three phase stator winding configuration of stator windings with respect to the switching vector $V_1$ shown in FIG. 2.

FIG. 3 is a circuit diagram m which represents a three phase stator winding configuration of stator windings with respect to the switching vector $V_1$ shown in FIG. 2. In FIG. 3, a voltage (Vdc) exists between node a and node bc, an inductance ($l_a$) is coupled between node a and node n, an inductance ($l_b$) is coupled between node n and node b, and, an inductance ($l_c$) is coupled between node n and node c.

Figure 4:
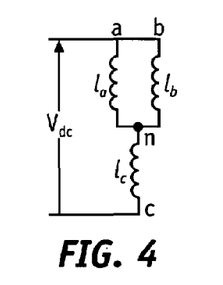
FIG. 4 is a circuit diagram which represents a three phase stator winding configuration of stator windings with respect to the switching vector $V_2$ shown in FIG. 2.

FIG. 4 is a circuit diagram which represents a three phase stator winding configuration of stator windings with respect to the switching vector $V_2$ shown in FIG. 2. In FIG. 4, a voltage (Vdc) exists between node ab and node c, an inductance ($l_a$) is coupled between node a and node n, an inductance ($l_b$) is coupled between node n and node b, and an inductance ($l_c$) is coupled between node n and node c.

Figure 5:
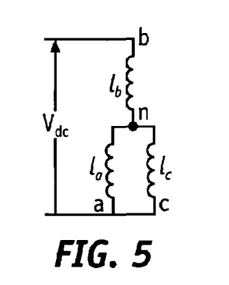
FIG. 5 is a circuit diagram which represents a three phase stator winding configuration of stator windings with respect to the switching vector $V_3$ shown in FIG. 2.

FIG. 5 is a circuit diagram which represents a three phase stator winding configuration of stator windings with respect to the switching vector $V_3$ shown in FIG. 2. In FIG. 5, a voltage (Vdc) exists between node b and node ac, an inductance ($l_b$) is coupled between node b and node n, an inductance ($l_a$) is coupled between node n and node a, and an inductance ($l_c$) is coupled between node n and node c.

Figure 6:
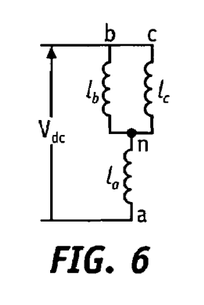
FIG. 6 is a circuit diagram which represents a three phase stator winding configuration of stator windings with respect to the switching vector $V_4$ shown in FIG. 2.

FIG. 6 is a circuit diagram which represents a three phase stator winding configuration of stator windings with respect to the switching vector $V_4$ shown in FIG. 2. In FIG. 6, a voltage (Vdc) exists between node bc and node a, an inductance ($l_a$) is coupled between node n and node a, an inductance ($l_b$) is coupled between node n and node b, and an inductance ($l_c$) is coupled between node n and node c.

Figure 7:
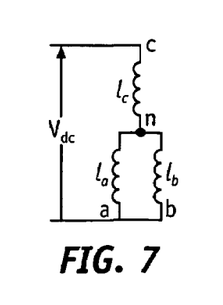
FIG. 7 is a circuit diagram which represents a three phase stator winding configuration of stator windings with respect to the switching vector $V_5$ shown in FIG. 2.

FIG. 7 is a circuit diagram which represents a three phase stator winding configuration of stator windings with respect to the switching vector $V_5$ shown in FIG. 2. In FIG. 7, a voltage (Vdc) exists between node c and node ab, an inductance ($l_c$) is coupled between node c and node n, an inductance ($l_a$) is coupled between node n and node a, and an inductance ($l_b$) is coupled between node n and node b.

Figure 8:
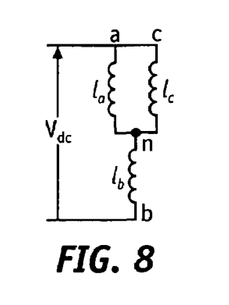
FIG. 8 is a circuit diagram which represents a three phase stator winding configuration of stator windings with respect to the switching vector $V_6$ shown in FIG. 2.

FIG. 8 is a circuit diagram which represents a three phase stator winding configuration of stator windings with respect to the switching vector $V_6$ shown in FIG. 2. In FIG. 3, a voltage (Vdc) exists between node ac and node b, an inductance ($l_a$) is coupled between node a and node n, an inductance ($l_b$) is coupled between node n and node b, and an inductance ($l_c$) is coupled between node n and node c.

Using FIGS. 3-8, the zero sequence voltage can be calculated for each configuration. In case of voltage vector $V_1$, three phase-to-neutral voltages are shown in equations (9) and (10), where $$l_b \| l_c \text{ is } \frac{l_b l_c}{l_b + l_c}.$$

$$V_{an} = \frac{l_a}{l_a + l_b \| l_c} V_{dc} \quad (9)$$

$$V_{bn} = V_{cn} = -\frac{l_b \| l_c}{l_a + l_b \| l_c} V_{dc} \quad (10)$$

The zero sequence voltage for voltage vector $V_1$ is given in equation (11).

$$V_{sn\_v1} = V_{an} + V_{bn} + V_{cn} = \frac{l_a - 2l_b \| l_c}{l_a + l_b \| l_c} V_{dc} \quad (11)$$

When the stator phase inductances ($l_a, l_b, l_c$) are equivalent, the sum of equation (11) is zero. However, when the stator inductances are different due to the saturation effect, the sum of equation (11) will not be zero and will have the information regarding the inductance variation. Similarly, the zero sequence voltage due to each voltage vector $V_2 \ldots V_8$ can be calculated as shown in equations (12)-(16).

$$V_{sn\_v2} = V_{an} + V_{bn} + V_{cn} = \frac{-l_c + 2l_a \| l_b}{l_c + l_a \| l_b} V_{dc} \quad (12)$$

$$V_{sn\_v3} = V_{an} + V_{bn} + V_{cn} = \frac{l_b - 2l_a \| l_c}{l_b + l_a \| l_c} V_{dc} \quad (13)$$

$$V_{sn\_v4} = V_{an} + V_{bn} + V_{cn} = \frac{-l_a + 2l_b \| l_c}{l_a + l_b \| l_c} V_{dc} \quad (14)$$

-continued $$V_{sn\_v5} = V_{an} + V_{bn} + V_{cn} = \frac{l_c - 2l_a \| l_b}{l_c + l_a \| l_b} V_{dc} \quad (15)$$

$$V_{sn\_v6} = V_{an} + V_{bn} + V_{cn} = \frac{-l_b - 2l_a \| l_c}{l_b + l_a \| l_c} V_{dc} \quad (16)$$

Equations (12) through (16) show that the zero sequence voltage $V_{sn\_v4}$, $V_{sn\_v6}$ and $V_{sn\_v2}$ are the same as $V_{sn\_v1}$, $V_{sn\_v2}$ and $V_{sn\_v3}$ except for the sign or phase.

Figure 9:
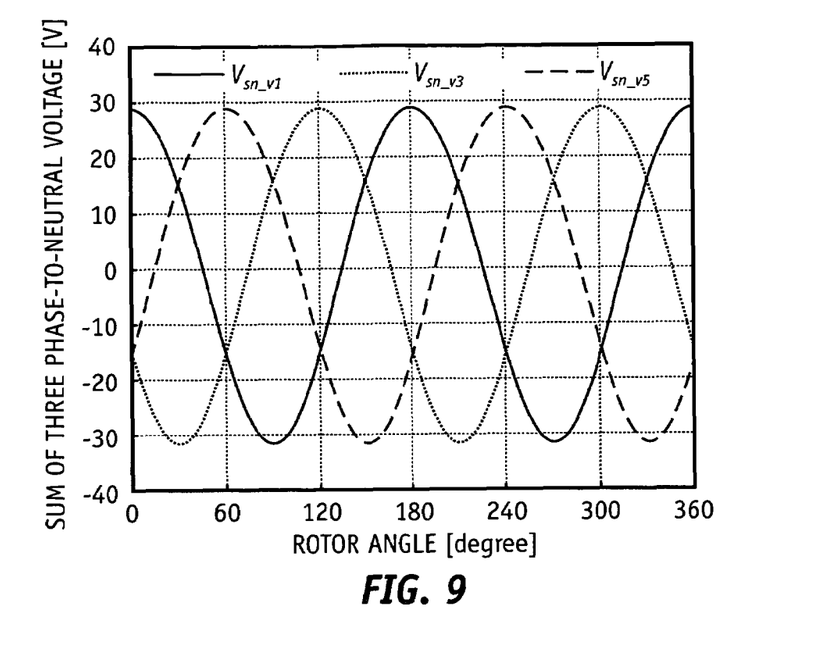
FIG. 9 is a graph showing zero sequence voltages ($V_{A\_sn}$, $V_{B\_sn}$ and $V_{C\_sn}$) with respect to rotor angle which illustrates inductance inequality of the zero sequence voltages ($V_{A\_sn}$, $V_{B\_sn}$, and $V_{C\_sn}$)

FIG. 9 is a graph showing zero sequence voltages ($V_{A\_sn}$, $V_{B\_sn}$ and $V_{C\_sn}$) with respect to rotor angle which illustrates inductance inequality of the zero sequence voltages ($V_{A\_sn}$, $V_{B\_sn}$ and $V_{C\_sn}$). In FIG. 9, the sum of the three phase-to-neutral voltages is shown as a function of rotor angle. These voltage waveforms are generated from equations (6) through (8) with 10% variation of the average inductances (i.e. $l_\sigma = 0.1 * L_{s0}$) and 300V DC link voltage. The voltage $V_{A\_sn}$ is the sum of the three phase-to-neutral voltages resulting due to the voltage vector $V_1$. The voltages $V_{B\_sn}$ and $V_{C\_sn}$ are the sums of three phase-to-neutral voltages resulting from the voltage vectors $V_3$ and $V_5$, respectively. FIG. 9 shows that the small change (i.e. 10%) in the stator inductance produces a strong voltage signal (±30V). The zero sequence voltage is directly related to the inductance variance, which is caused by the stator saturation. The zero sequence voltages ($V_{A\_sn}$, $V_{B\_sn}$ and $V_{C\_sn}$) are spatially separated by 120° and are of twice the rotor fundamental frequency.

Figure 10:
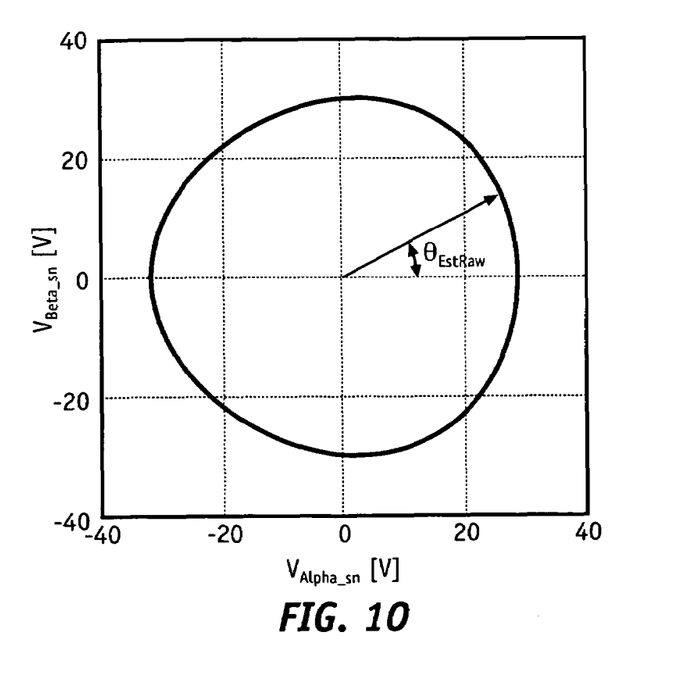
FIG. 10 is a graph showing a trace of vector (Vsn) which represents zero sequence voltages ($V_{A\_sn}$, $V_{B\_sn}$ and $V_{C\_sn}$) transformed to d- and q-axis stationary reference frame with an Alpha component and a Beta component of the zero sequence voltages plotted in x-y coordinates.

FIG. 10 is a graph showing a trace of vector (Vsn) which represents zero sequence voltages ($V_{A\_sn}$, $V_{B\_sn}$ and $V_{C\_sn}$) transformed to d- and q-axis stationary reference frame with an Alpha component and a Beta component of the zero sequence voltages plotted in x-y coordinates. In FIG. 10, these three signals are transformed to d-axis and q-axis stationary reference frame using the transformation as shown in equation (17). The Alpha and Beta component of the zero sequence voltages are plotted in x-y coordinate in FIG. 10. The traces periodically rotate along the circle with small distortion.

$$\begin{bmatrix} V_{alpha\_sn} \\ V_{beta\_sn} \end{bmatrix} = \frac{2}{3} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} V_{A\_sn} \\ V_{B\_sn} \\ V_{C\_sn} \end{bmatrix} \quad (17)$$

Figure 11:
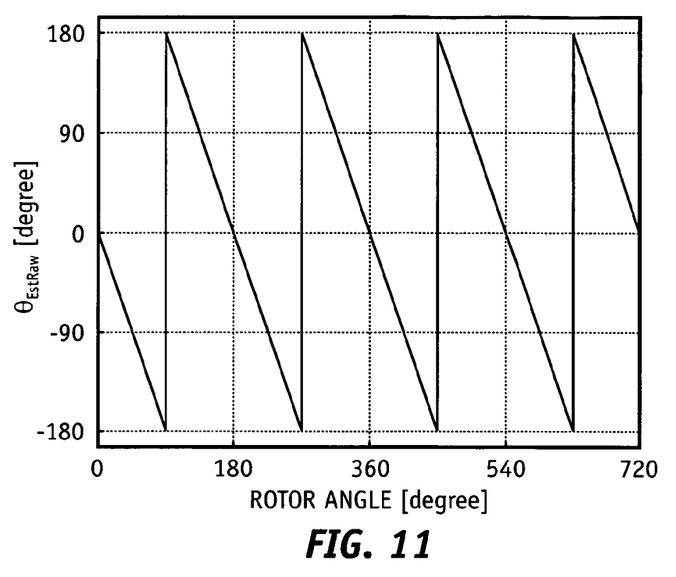
FIG. 11 is a graph showing the phase of the vector (Vsn) represented by $\theta_{EstRaw}$ (Flux angle) in FIG. 10.

FIG. 11 is a graph showing the phase of the vector (Vsn) represented by flux angle ($\theta_{EstRaw}$) in FIG. 10. The flux angle ($\theta_{EstRaw}$) is shown as a function of rotor angle. The flux angle ($\theta_{EstRaw}$) is shown in equation (18).

$$\theta_{EstRaw} = \text{atan } 2(V_{Beta\_sn}, V_{Alpha\_sn}) \quad (18)$$

As shown in FIG. 11, the frequency is twice that of the rotor angle and the phase is synchronized with the rotor angle. The rotor angle can be derived using digital signal processing of the phase information. The result shows that the rotor angle can be estimated by measuring the three zero sequence voltages ($V_{A\_sn}$, $V_{B\_sn}$ and $V_{C\_sn}$) one-by-one, while the voltage vectors $V_1$, $V_2$ and $V_3$ are injected.

Implementation of Invention

Figure 12:
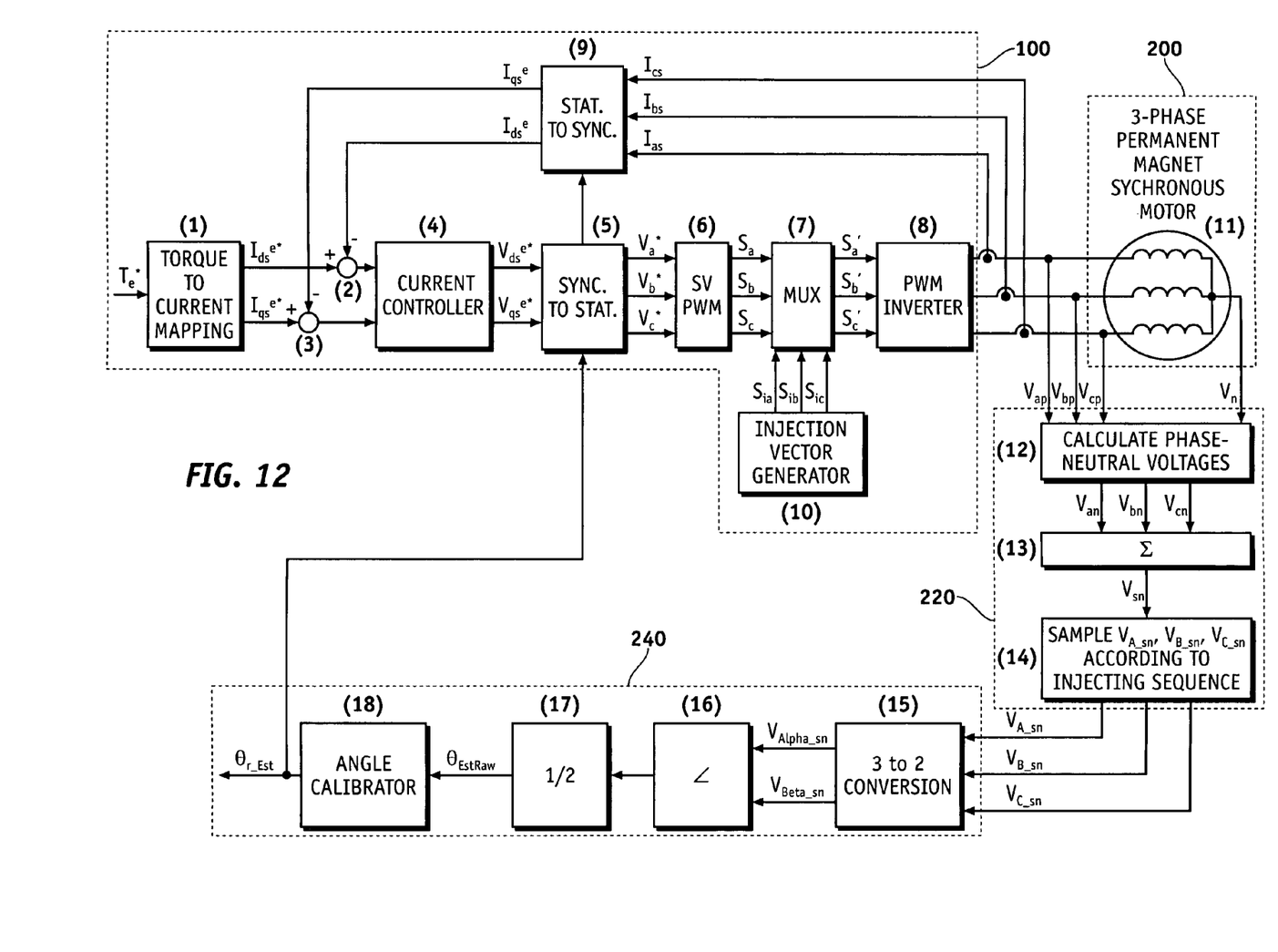
FIG. 12 is a block diagram of a control system which implements a sensorless algorithm using control hardware and 50 kW axial flux SMPMM.

FIG. 12 is a block diagram of a control system which implements a sensorless algorithm using control hardware and an axial flux SMPMM. However, the same method is also valid for the general 3-phase synchronous motor, such as Brushless DC Motor (BLDC), Interior Permanent Magnet Synchronous Motor (IPMSM) and Reluctance Motors.

The control system comprises a stator current converter 100, a motor 200, a voltage generator module 220, and an output module 240.

In this implementation, the stator current converter 100 can receive a torque command (T*e) and generate three-phase sinusoidal voltage commands (Vap . . . Vcp). The motor 200 can receive the three-phase sinusoidal voltage commands (Vap . . . Vcp) and generate the motor output (Vn).

The voltage generator module 220 can receive the three-phase sinusoidal voltage commands (Vap . . . Vcp) and the motor output (Vn) and generate sampled three-phase zero-sequence voltages (VA_sn . . . VC_sn).

The output module 240 can receive sampled three-phase zero-sequence voltages (VA_sn . . . VC_sn) and generate the final estimated rotor position angle (θr_est).

According to one possible non-limiting implementation, components or modules which may be used to implement such a control system comprise a current mapping module (1), summer junctions (2) and (3), a current controller module (4), a synchronous-to-stationary conversion module (5), a Space Vector PWM module (6), a multiplexer module (7), a PWM inverter (8), a stationary-to-synchronous conversion module (9), an injection vector generator module (10), a 3-phase permanent magnet synchronous motor (11), a phase-neutral voltage calculator module (12), a summing junction (13), a zero sequence voltage sampling module (14), a three phase-to-two phase conversion module (15), an angle calculator module (16), a divider module (17), and an angle calibrator module (18).

In one implementation, the stator current converter 100 comprises a torque-to-current mapping module (1), a current-controller module (4), a synchronous-to-stationary conversion module (5), a space-vector PWM module (6), an injection vector generator, a multiplexer (7), a PWM inverter (8), a stationary-to-synchronous conversion module (9), and a (10).

The torque-to-current mapping module (1) can receive the torque command (T*e) and generate the d-axis current command (Idse*) and the q-axis current command (Iqse*). The current-controller module (4) can receive the d-axis current error and the q-axis current error and generate the d-axis voltage command (Vdse*) and the q-axis voltage command (Vqse*), wherein the d-axis current error and the q-axis current error comprises a combination of the d-axis current command (Idse*) and the q-axis current command (Iqse*) and the synchronous reference frame currents (Iqse, Idse).

The synchronous-to-stationary conversion module (5) can receive the d-axis voltage command (Vdse*) and the q-axis voltage command (Vqse*) and the final estimated rotor position angle (θr_est) and generate the three-phase sinusoidal voltage commands (Va* . . . Vc*). The space-vector PWM module (6) can receive the three-phase sinusoidal voltage commands (Va* . . . Vc*) and generate switching vectors (Sa . . . Sc).

The injection vector generator (10) can generate injection vectors (Sia . . . Sic). The multiplexer (7) can receive switching vectors (Sa . . . Sc) and injection vectors (Sia . . . Sic) and generate modified switching vectors (Sa' . . . Sc'). The PWM inverter (8) can receive modified switching vectors (Sa' . . . Sc') and generate the three-phase sinusoidal voltage commands (Vap . . . Vcp) which can be converted to resultant stator currents (Ias . . . Ics).

The stationary-to-synchronous conversion module (9) can receive resultant stator currents (Ias . . . Ics) and (θr_Est) and generate the synchronous reference frame currents (Iqse, Idse).

In one implementation, the motor 200 comprises a three-phase permanent-magnet synchronous motor (PMSM) (11) configured to receive the three-phase sinusoidal voltage commands (Vap . . . Vcp) and generate a motor output (Vn).

In one implementation, the voltage generator module 220 comprises a phase-to-neutral voltage generator (12), a summing junction (13), and a sampler module (14). The phase-to-neutral voltage generator (12) can receive the three-phase sinusoidal voltage commands (Vap . . . Vcp) and the motor output (Vn) and can generate the machine phase voltages (Van . . . Vcn). The summing junction (13) can receive the machine phase voltages (Van . . . Vcn) and generate the zero-sequence voltage (Vsn). The sampler module (14) can receive the zero-sequence voltage (Vsn) and generate sampled three-phase zero-sequence voltages (VA_sn . . . VC_sn).

In one implementation, the output module 240 comprises a three-to-to converter module (15), an angle calculator module (16), an angle converter module (17), and an angle calibrator module (18). The three-to-to converter module (15) can receive the sampled three-phase zero-sequence voltages (VA_sn . . . VC_sn) and generate two-phase zero-sequence voltages (VAlpha_sn). The angle calculator module (16) can receive two-phase zero-sequence voltages (VAlpha_sn) and generate angle of the saturation induced saliency. The angle converter module (17) can receive angle of the saturation induced saliency and generate rotor position angle (θEstRaw).

The angle calibrator module (18) can receive rotor position angle (θEstRaw) and generate the final estimated rotor position angle (θr_est).

Operation of Control System

The current mapping module (1) is coupled to summer junctions (2) and (3), which are coupled to a current controller module (4) and receive the output of the stationary-to-synchronous conversion module (9). Torque command (T*$_e$) is passed to torque to current mapping module (1) which generates the d and q axes current commands Idse* and Iqse* respectively. These current commands are added to the feedback measured current Idse and Iqse via the summer junctions (2) and (3) respectively. The d and q-axes current error is fed to current controller module (4) which generates the d and q-axes voltage commands Vdse* and Vqse* respectively.

The output voltage commands are processed through synchronous to stationary conversion module (5) to generate three phase sinusoidal voltage commands Va*, Vb* and Vc*. The synchronous-to-stationary conversion module (5) receives inputs from the current controller module (4) and the angle calibrator module (18), and generates outputs sent to the Space Vector PWM module (6). The Space Vector PWM module (6) uses the output of the synchronous-to-stationary conversion module (5) to generate inputs for the multiplexer module (7) which also receives inputs from the injection vector generator module (10).

Figure 13:
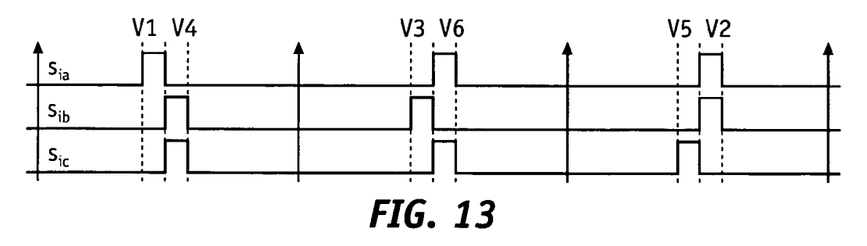
FIG. 13 is a graph showing injecting vectors (Sia, Sib and Sic) for zero sequence voltage measurement.
Figure 14:
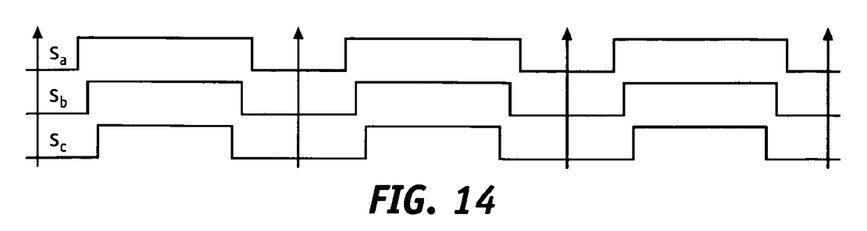
FIG. 14 is a graph showing a normal Space Vector PWM (SVPWM) waveform for current control with switching states (Sa, Sb and Sc) for phases A, B and C, respectively.
Figure 15:
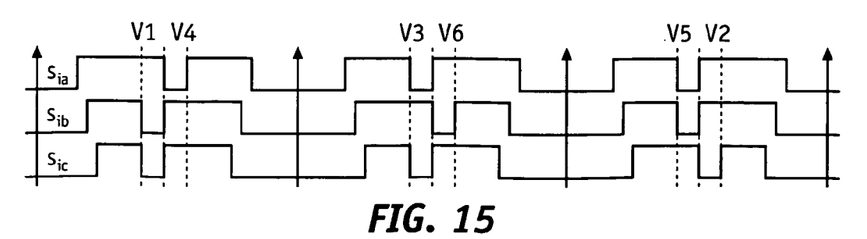
FIG. 15 is a graph showing a synthesized PWM waveform with modified switching vectors (Sa*, Sb* and Sc*) used to switch IGBT switches in PWM inverter to generate three phase sinusoidal voltage commands.

FIGS. 13-15 are a series of graphs showing synthesis of normal Space Vector PWM (SVPWM) waveform and injecting vectors. It should be appreciated that there are several different choices in the sequence of the injecting vectors and the position of injecting vectors. In this example, the injecting vectors (Sia, Sib and Sic) are positioned at the center of the zero vector (V7(1,1,1)) in the SVPWM waveforms. The two complementary vectors (V1-V4, V3-V5 and V5-V2) are injected sequentially to minimize the deviation of motor currents.

FIG. 13 is a graph showing injecting vectors (Sia, Sib and Sic) for zero sequence voltage measurement. These voltage commands are then converted to switching states (Sa, Sb and Sc) for phases A, B and C respectively via Space Vector PWM module (6). FIG. 14 is a graph showing a normal Space Vector PWM (SVPWM) waveform for current control with switching states (Sa, Sb and Sc) for phases A, B and C, respectively.

Referring again to FIG. 12, the multiplexer module (7) generates inputs for the PWM inverter (8). The multiplexer module (7) modifies these switching vectors with injection vectors Sia, Sib and Sic generated by module (10). The modified switching vectors Sa', Sb' and Sc' are then used to switch the IGBT switches in PWM inverter (8) to generate three phase sinusoidal voltage commands. FIG. 15 is a graph showing a synthesized PWM waveform with modified switching vectors (Sa', Sb' and Sc') used to switch IGBT switches in PWM inverter to generate three phase sinusoidal voltage commands.

Referring again to FIG. 12, the output generated by the PWM inverter (8) is supplied to the 3-phase permanent magnet synchronous motor (11) to generate the commanded torque Te* and to the phase-neutral voltage calculator module (12). The resultant stator currents (Ias, Ibs and Ics) are sensed, sampled and passed to the stationary-to-synchronous conversion module (9). The output of the stationary-to-synchronous conversion module (9) is synchronous reference frame currents (Iqs$^e$ and Ids$^e$) which are supplied to the summing junctions (2) and (3) to generate the current errors (Iqs$^e$* and Ids$^e$*).

Machine terminal phase voltages (Van, Vbn and Vcn) are measured with respect to the neutral point and supplied to the phase-neutral voltage calculator module (12). The phase-neutral voltage calculator module (12) receives the output of both the PWM inverter (8) and the 3-phase permanent magnet synchronous motor (11), and uses these to generate phase to neutral voltages ($V_{an}$, $V_{bn}$, $V_{cn}$) which are provided to the summing junction (13).

The summing junction (13) combines the input signals ($V_{an}$, $V_{bn}$, $V_{cn}$) to generate a zero sequence voltage ($V_{sn}$). The zero sequence voltage ($V_{sn}$) is supplied to zero sequence voltage sampling module (14). The zero sequence voltage sampling module (14) samples the zero sequence voltages for each of the three phases to align the sample with the injected vector. The zero sequence voltage sampling module (14) samples the zero sequence voltage ($V_{sn}$) according to injecting sequence, and generates three-phase zero sequence voltages ($V_{A\_sn}$, $V_{B\_sn}$, $V_{C\_sn}$), which are supplied to a three phase-to-two phase conversion module (15) for three phase to two phase conversion.

The three phase-to-two phase conversion module (15) converts the three-phase zero sequence voltages ($V_{A\_sn}$, $V_{B\_sn}$, $V_{C\_sn}$) to two-phase voltages ($V_{Alpha\_sn}$, $V_{Beta\_sn}$), which are then passed through to the angle calculator module (16). The output of module (16) is the angle of the saturation induced saliency which is of the twice the fundamental frequency. The divider module (17) converts this signal to the rotor position angle by dividing with 2. The estimated raw rotor position is passed to an angle calibrator module (18) to calculate the final estimated rotor position angle θr_Est.

Experimental Results:

The proposed sensorless algorithm of FIG. 12 was implemented and tested using a General Motors prototype traction control hardware which includes the motor controller and 50 kW axial flux wheel hub motor or SMPMM. The experimental results are shown in FIGS. 16-19.

Figure 16:
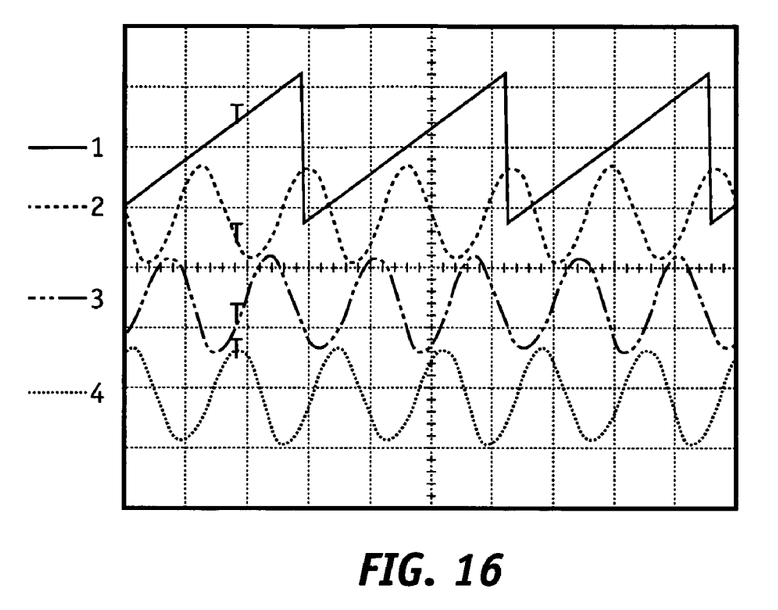
FIG. 16 is a graph showing three phase saturation induced (zero sequence voltage) signals at no load condition when no load torque is applied.

FIG. 16 is a graph showing three phase saturation induced (zero sequence voltage) signals at no load condition when no load torque is applied. In this example, Vdc=300V, 60 rpm, Width=9 us, SampDelay=9 uS, Te=0, Ch1: Measured rotor position [2.5 rad/sec/div], Ch2,3,4: $V_{A\_sn}$, $V_{B\_sn}$ and $V_{C\_sn}$ [50V/div]. The experimental results shown in FIG. 16 illustrate strong zero sequence signals which can be used to deduce the rotor position. Thus, robust rotor position estimation is possible.

Figure 17:
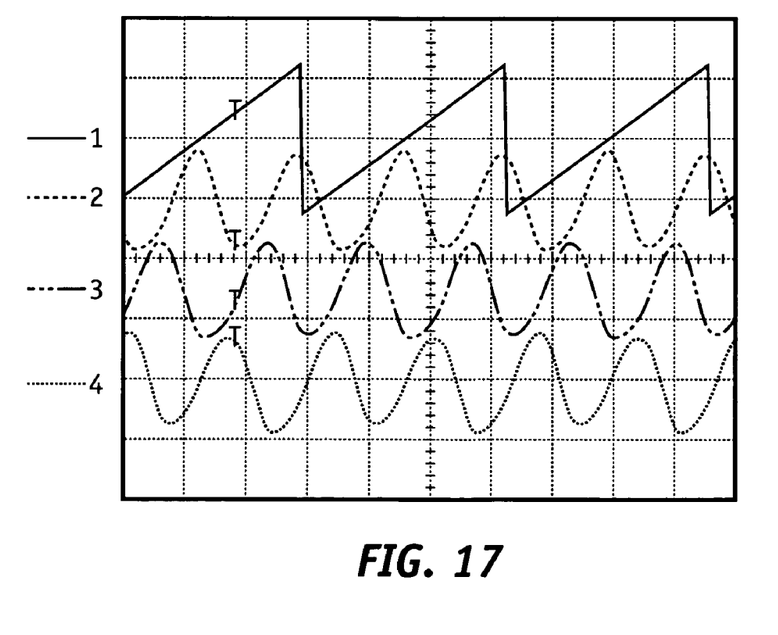
FIG. 17 is a graph showing three phase saturation induced (zero sequence voltage) signals at a 40% load condition when no load torque is applied.

FIG. 17 is a graph showing three phase saturation induced (zero sequence voltage) signals at a 40% load condition when no load torque is applied. In this example, Vdc=300V, 60 rpm, Width=9 us, SampDelay=9 uS, Te=200 Nm, Ch1: Measured rotor position [2.5 rad/sec/div], Ch2,3,4: $V_{A\_sn}$, $V_{B\_sn}$ and $V_{C\_sn}$ [50V/div]. The experimental results shown in FIG. 17 illustrate that even under loaded condition the zero sequence signal strength is maintained. The test results under loaded condition exhibit additional harmonic contents which can be eliminated to estimate the second order harmonic (i.e., saturation induced saliency component) to estimate the rotor position.

Figure 18:
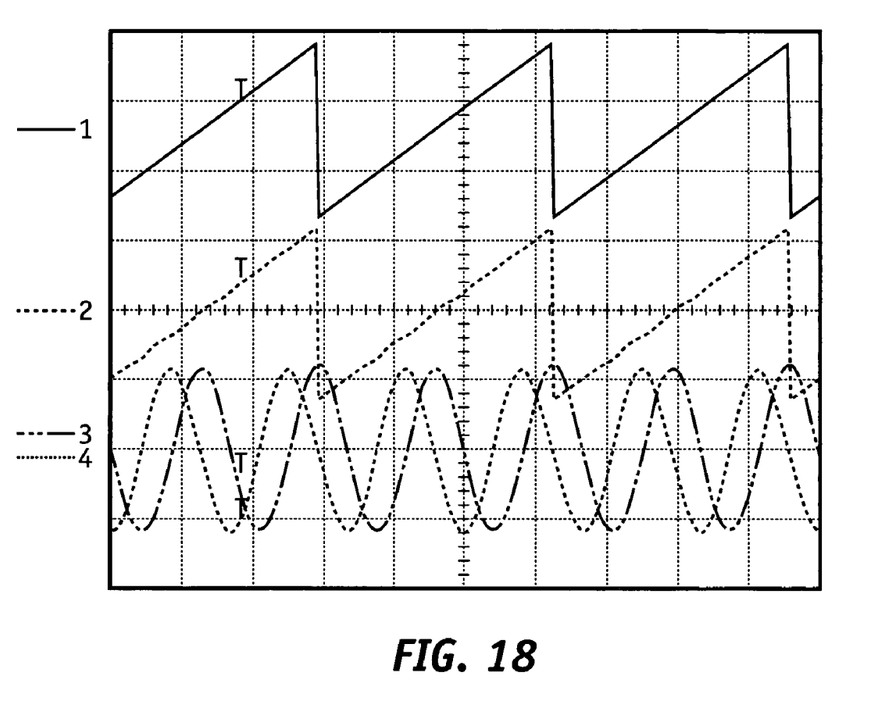
FIG. 18 is a graph showing measured and estimated rotor position angles with two phase saturation induced signals at no load condition when no load torque is applied.
Figure 19:
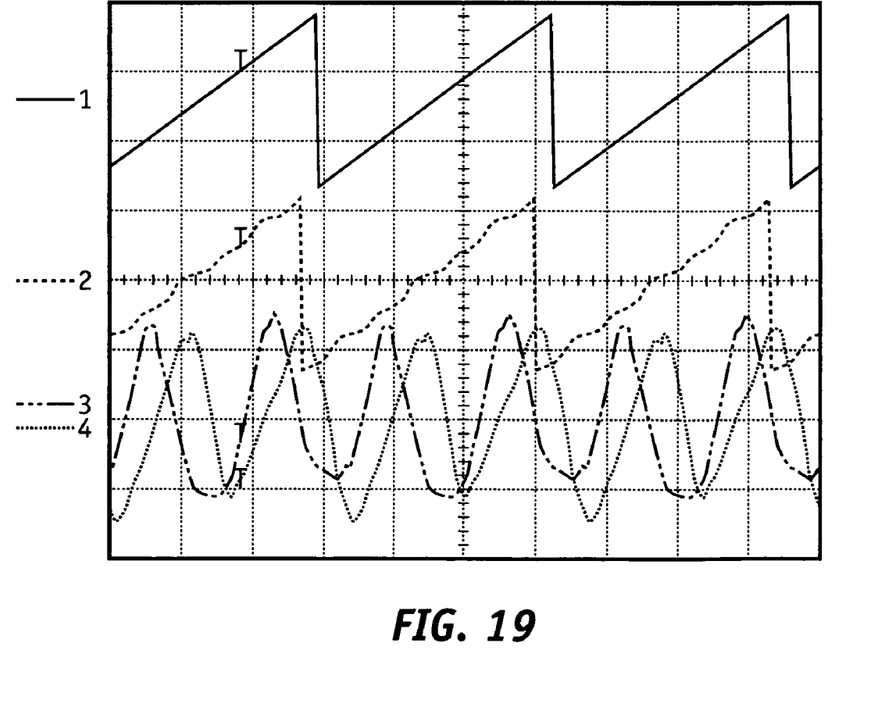
FIG. 19 is a graph showing measured and estimated rotor position angles with two phase saturation induced signals at full load condition when 100% load torque is applied.

FIG. 18 is a graph showing measured and estimated rotor position angles with two phase saturation induced signals at no load condition when no load torque is applied. In this example, Vdc=300V, 60 rpm, Width=9 uS, SampDelay=9 uS, Te=0 Nm, Ch1,2: Measured and estimated rotor position [2.5 rad/sec/div], Ch3,4: $V_{Alpha\_sn}$ and $V_{Beta\_sn}$ [50V/div]. FIG. 19 is a graph showing measured and estimated rotor position angles with two phase saturation induced signals at full load condition when 100% load torque is applied. In this example, Vdc=300V, 60 rpm, Width=9 us, SampDelay=9 uS, Te=500 Nm, Ch1,2: Measured and estimated rotor position [2.5 rad/sec/div], Ch3,4: $V_{Alpha\_sn}$ and $V_{Beta\_sn}$ [50V/div]. The experimental results shown in FIGS. 18 and 19, show that under no load and full load conditions the estimated rotor position signal exhibits excellent performance.

The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical. Furthermore, numerical ordinals such as "first," "second," "third," etc. simply denote different singles of a plurality and do not imply any order or sequence unless specifically defined by the claim language.

Furthermore, words such as "connect" or "coupled to" used in describing a relationship between different elements do not imply that a direct physical connection must be made between these elements. For example, two elements may be connected to each other physically, electronically, logically, or in any other manner, through one or more additional elements, without departing from the scope of the invention.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The word "exemplary" is used exclusively herein to mean "serving as an example, instance, or illustration." Any embodiment described herein as "exemplary" is not necessarily to be construed as preferred or advantageous over other embodiments.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method, comprising:
   receiving a torque command;
   generating a d-axis current command and a q-axis current command based on the torque command;
   generating a d-axis voltage command and a q-axis voltage command based on d-axis current error comprising a combination of the d-axis current command and the synchronous reference frame currents and a q-axis current error comprising a combination of the q-axis current command and the synchronous reference frame currents;
   generating three-phase sinusoidal voltage commands based on the d-axis voltage command, the q-axis voltage command and the final estimated rotor position angle;
   generating switching vectors based on the three-phase sinusoidal voltage commands;
   generating modified switching vectors by multiplexing the switching vectors and the injection vectors; and
   generating three-phase voltage commands and resultant stator currents based on the modified switching vectors;
   generating a motor output responsive to the three-phase voltage commands; and
   generating three-phase zero-sequence voltage samples based on the three-phase voltage commands and the motor output.

2. A method according to claim 1, further comprising:
   generating a final estimated rotor position angle output based on sampled three-phase zero-sequence voltages.

3. A method according to claim 1, wherein further comprising:
   generating machine phase voltages based on the three-phase voltage commands and the motor output;
   summing the machine phase voltages to generate a zero-sequence voltage; and
   sampling the zero-sequence voltages to generate the three-phase zero-sequence voltage samples.

4. A method according to claim 2, wherein generating a final estimated rotor position angle output comprises:
   converting the sampled three-phase zero-sequence voltages into two-phase zero-sequence voltages;
   calculating the angle of the saturation induced saliency based on the two-phase zero-sequence voltages;
   converting the angle of the saturation induced saliency into a rotor position angle; and
   generating a final estimated rotor position angle output based on the rotor position angle.

5. A computer program product for executing the method of claim 1.

6. A system, comprising:
   a motor configured to receive the voltage commands and generate the motor output;
   a voltage generator configured to receive voltage commands and a motor output, and configured to generate sampled zero-sequence voltages in response to the voltage commands and the motor output; and wherein the voltage generator comprises: a summing junction configured to receive the machine phase voltages and generate the zero-sequence voltage; and a sampler configured to receive the zero-sequence voltage and generate sampled zero-sequence voltages; and
   an output element configured to receive the sampled zero-sequence voltages and configured to generate a final estimated rotor position angle, wherein the output element comprises: a converter configured to receive sampled zero-sequence voltages and generate two-phase zero-sequence voltages; and a processor configured to: receive two-phase zero-sequence voltages and generate angle of the saturation induced saliency; receive angle of the saturation induced saliency and generate rotor position angle; and receive rotor position angle and generate the final estimated rotor position angle.

7. A system according to claim 6, further comprising:
a current converter configured to receive a torque command and generate the voltage commands.

8. A system according to claim 6, wherein the current converter comprises:
a mapper configured to receive the torque command and generate the d-axis current command and the q-axis current command;
a current-controller configured to receive the d-axis current error and the q-axis current error and generate the d-axis voltage command and the q-axis voltage command, wherein the d-axis current error and the q-axis current error comprises a combination of the d-axis current command and the q-axis current command and the synchronous reference frame currents;
a first converter configured to receive the d-axis voltage command and the q-axis voltage command and the final estimated rotor position angle and generate the sinusoidal voltage commands;
a vector generator configured to receive the sinusoidal voltage commands and generate switching vectors and to generate injection vectors;
a combiner configured to receive the switching vectors and the injection vectors and generate modified switching vectors;
an inverter configured to receive modified switching vectors and generate the voltage commands which are also converted to resultant stator currents; and
a second converter configured to receive resultant stator currents and generate the synchronous reference frame currents.

9. A system according to claim 6, wherein the motor comprises a permanent-magnet synchronous motor (PMSM) configured to receive the voltage commands and generate a motor output.

10. A system, comprising:
a motor configured to receive three-phase voltage commands and generate a motor output; and
a voltage generator module configured to receive three-phase voltage commands and a motor output, and configured to generate sampled three-phase zero-sequence voltages in response to the three-phase voltage commands and the motor output, wherein the voltage generator module comprises:
a phase-to-neutral voltage generator configured to receive the three-phase voltage commands and the motor output and to generate the machine phase voltages;
a summing junction configured to receive the machine phase voltages and generate the zero-sequence voltage; and
a sampler module configured to receive the zero-sequence voltage and generate sampled three-phase zero-sequence voltages; and
an output module configured to receive the sampled three-phase zero-sequence voltages and generate a final estimated rotor position angle, wherein the output module comprises:
a three-to-two converter module configured to receive sampled three-phase zero-sequence voltages and generate two-phase zero-sequence voltages;
an angle calculator module configured to receive two-phase zero-sequence voltages and generate angle of the saturation induced saliency;
an angle converter module configured to receive angle of the saturation induced saliency and generate rotor position angle; and
an angle calibrator module configured to receive rotor position angle and generate the final estimated rotor position angle.

11. A system according to claim 10, further comprising:
a stator current converter configured to receive a torque command and generate the three-phase voltage commands.

12. A system according to claim 11, wherein the stator current converter comprises:
a torque-to-current mapping module configured to receive the torque command and generate the d-axis current command and the q-axis current command;
a current-controller module configured to receive the d-axis current error and the q-axis current error and generate the d-axis voltage command and the q-axis voltage command, wherein the d-axis current error and the q-axis current error comprises a combination of the d-axis current command and the q-axis current command and the synchronous reference frame currents;
a synchronous-to-stationary conversion module configured to receive the d-axis voltage command and the q-axis voltage command and the final estimated rotor position angle and generate the three-phase sinusoidal voltage commands;
a space-vector PWM module configured to receive the three-phase sinusoidal voltage commands and generate switching vectors;
an injection vector generator configured to generate injection vectors;
a multiplexer configured to receive switching vectors and injection vectors and generate modified switching vectors;
a PWM inverter configured to receive modified switching vectors and generate the three-phase voltage commands which is converted to resultant stator currents; and
a stationary-to-synchronous conversion module configured to receive resultant stator currents and generate the synchronous reference frame currents.

13. A system according to claim 10, wherein the motor comprises a three-phase permanent-magnet synchronous motor (PMSM) configured to receive the three-phase voltage commands and generate a motor output.

14. A method, comprising:
receiving a torque command;
generating three-phase voltage commands based on the torque command;
generating a motor output responsive to the three-phase voltage commands;
generating three-phase zero-sequence voltage samples based on the three-phase voltage commands and the motor output; and
converting the sampled three-phase zero-sequence voltages into two-phase zero-sequence voltages;
calculating the angle of the saturation induced saliency based on the two-phase zero-sequence voltages;
converting the angle of the saturation induced saliency into a rotor position angle; and
generating a final estimated rotor position angle output based on the rotor position angle.

15. A method according to claim 14, wherein generating three-phase zero-sequence voltage samples further comprises:
generating machine phase voltages based on the three-phase voltage commands and the motor output;
summing the machine phase voltages to generate a zero-sequence voltage; and sampling the zero-sequence voltages to generate the three-phase zero-sequence voltage samples.

16. A method according to claim 14, wherein generating three-phase voltage commands based on the torque command comprises:
   generating a d-axis current command and a q-axis current command based on the torque command;
   generating a d-axis voltage command and a q-axis voltage command based on d-axis current error comprising a combination of the d-axis current command and the synchronous reference frame currents and a q-axis current error comprising a combination of the q-axis current command and the synchronous reference frame currents;
   generating three-phase sinusoidal voltage commands based on the d-axis voltage command, the q-axis voltage command and the final estimated rotor position angle;
   generating switching vectors based on the three-phase sinusoidal voltage commands;
   generating modified switching vectors by multiplexing the switching vectors and the injection vectors; and
   generating three-phase voltage commands and resultant stator currents based on the modified switching vectors.

17. A computer program product for executing the method of claim 14.

* * * * *